(12) United States Patent
Yang et al.

(10) Patent No.: US 12,384,688 B2
(45) Date of Patent: Aug. 12, 2025

(54) SCM-33 MOLECULAR SIEVE, PREPARATION METHOD THEREFOR AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Weimin Yang, Shanghai (CN); Wenhua Fu, Shanghai (CN); Zhendong Wang, Shanghai (CN); Zhiqing Yuan, Shanghai (CN); Jiawei Teng, Shanghai (CN); Jian Qiao, Shanghai (CN); Weichuan Tao, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 407 days.

(21) Appl. No.: 17/997,960

(22) PCT Filed: Oct. 28, 2020

(86) PCT No.: PCT/CN2020/124331
§ 371 (c)(1),
(2) Date: Nov. 4, 2022

(87) PCT Pub. No.: WO2021/227381
PCT Pub. Date: Nov. 18, 2021

(65) Prior Publication Data
US 2023/0174384 A1    Jun. 8, 2023

(30) Foreign Application Priority Data

May 11, 2020   (CN) .......................... 202010393382.4

(51) Int. Cl.
*C01B 39/48*   (2006.01)
*B01J 20/18*   (2006.01)
(Continued)

(52) U.S. Cl.
CPC ............... *C01B 39/48* (2013.01); *B01J 20/18* (2013.01); *B01J 20/3042* (2013.01);
(Continued)

(58) Field of Classification Search
CPC ....... C01B 39/48; B01J 20/18; B01J 37/0018; B01J 37/031; B01J 37/04; B01J 20/30; C01P 2002/72; C01P 2002/74
See application file for complete search history.

(56) References Cited

U.S. PATENT DOCUMENTS

| | | |
|---|---|---|
| 6,713,041 B1 | 3/2004 | Moscoso et al. |
| 7,344,694 B2 | 3/2008 | Miller et al. |
| | (Continued) | |

FOREIGN PATENT DOCUMENTS

| | | |
|---|---|---|
| AU | 2007339946 B2 | 8/2012 |
| CN | 102811950 A | 12/2012 |
| | (Continued) | |

OTHER PUBLICATIONS

Marler, et.al. ("Structure refinement of the as-synthesized and the calcined form of zeolite RUB-3 (RTE)", Microporous and Mesoporous Materials 26 ( 1998) 49-59 (Year: 1998).*
(Continued)

*Primary Examiner* — Michael Forrest
*Assistant Examiner* — Nicole Lee Quist
(74) *Attorney, Agent, or Firm* — NKL Law; Allen Xue

(57) ABSTRACT

A SCM-33 molecular sieve has a schematic chemical composition as shown in the formula "$SiO_2 \cdot 1/x\ XO_{1.5} \cdot m$
(Continued)

$MO_{0.5}$", wherein X is a framework trivalent element, the Si/X molar ratio x is ≥5, M is a framework equilibrium cation, and the M/Si molar ratio is 0<m≤1. The molecular sieve is a novel molecular sieve with RTE topology and the molecular sieve requires short preparation time, involves a low synthesis cost and can be used as adsorbent or catalyst.

20 Claims, 2 Drawing Sheets

(51) Int. Cl.
*B01J 20/30* (2006.01)
*B01J 29/70* (2006.01)
*B01J 29/72* (2006.01)
*B01J 37/00* (2006.01)
*B01J 37/03* (2006.01)
*B01J 37/04* (2006.01)
*C01B 39/06* (2006.01)

(52) U.S. Cl.
CPC ....... *B01J 20/3057* (2013.01); *B01J 20/3085* (2013.01); *B01J 29/70* (2013.01); *B01J 29/7049* (2013.01); *B01J 29/72* (2013.01); *B01J 37/0018* (2013.01); *B01J 37/031* (2013.01); *B01J 37/04* (2013.01); *C01B 39/065* (2013.01); *C01P 2002/72* (2013.01); *C01P 2002/74* (2013.01); *C01P 2002/76* (2013.01); *C01P 2004/03* (2013.01)

(56) References Cited

U.S. PATENT DOCUMENTS

| 7,982,084 | B1 | 7/2011 | Moscoso et al. |
| 7,985,886 | B1* | 7/2011 | Jan ............................ C07C 2/66 |
| | | | 585/467 |
| 10,513,439 | B2* | 12/2019 | Ishikawa ................. C01B 39/48 |
| 2004/0186337 | A1 | 9/2004 | Rohde et al. |
| 2008/0031810 | A1 | 2/2008 | Miller et al. |
| 2019/0276323 | A1 | 9/2019 | Xie et al. |

FOREIGN PATENT DOCUMENTS

| CN | 104445246 A | 3/2015 |
| CN | 106673009 A | 5/2017 |
| CN | 106673010 A | 5/2017 |
| CN | 109694090 A | 4/2019 |
| EP | 3165280 A1 | 5/2017 |
| JP | 2013523583 A | 6/2013 |
| RU | 2058815 C1 | 4/1996 |
| RU | 2264408 C2 | 11/2005 |
| WO | 2011123337 A2 | 10/2011 |
| WO | 2017185820 A1 | 11/2017 |

OTHER PUBLICATIONS

Marler, B. et al.; "Decasils, a new order-disorder family of microporous silicas"; Zeolites; vol. 15; Year: 1995; pp. 388-399.

Marler, B. et al.; "Structure refinement of the as-synthesized and the calcined form of zeolite RUB-3(RTE)"; Microporous and Mesoporous Materials; vol. 26; Year: 1998; pp. 49-59.

* cited by examiner

SCM-33 MOLECULAR SIEVE, PREPARATION METHOD THEREFOR AND APPLICATION THEREOF

TECHNICAL FIELD

The present invention pertains to the field of molecular sieve, in particular to a SCM-33 molecular sieve, and the preparation method therefor and the application thereof.

BACKGROUND ART

Zeolites or the so-called molecular sieves are a kind of porous crystalline materials, and have regular molecular sizes, pore structures, a relatively strong acidity and a high hydrothermal stability. They are widely used in catalysis, adsorption, ion exchange and other fields, and play an irreplaceable role. At present, there are up to 248 molecular sieve topologies that have been approved by the International Zeolite Association.

In 1995, Marler et al. firstly reported the synthesis of a pure silicon molecular sieve RUB-3 and elucidated its structure (Zeolites, 1995, No. 15, pp. 388-399), after which this molecular sieve was given a framework type code RTE by the International Zeolite Association. Molecular sieves having a RTE structure consist of rte ($[4^45^46^2]$) units and $[4^65^46^68^2]$ cage structures and the interconnected cages form a one-dimensional pore structure with 8-membered ring openings (Microporous and Mesoporous Materials, 1998, No. 26, pp. 49-59). The RTE molecular sieve has a pore diameter of 3.6×4.3 Å, which is equivalent to the diameter of many small gas molecules, as allows a greater application potential of the molecular sieve in terms of gas adsorption and separation; on the other hand, the unique pore-cage structure also imparts a possibility of the RTE molecular sieve for the application in the field of catalysis.

RUB-3 is currently the only molecular sieve with RTE topology, but it faces the following problems in its synthesis: 1) the organic template exo-2-aminobicyclo [2.2.1] heptane is expensive and is used in a large amount such that the cost for the molecular sieve synthesis is high; 2) the crystal growth rate is low and the synthesis period is 90 days or more, even up to 1 year; 3) the crystal is of a column shape with a size of 50×50×150 μm, which is too large; 4) the framework is a siliceous framework and catalytic active centers can hardly be introduced.

Therefore, it is of great practical significance to develop a novel molecular sieve with RTE topology and the preparation method therefor.

CONTENTS OF INVENTION

The present invention provides a SCM-33 molecular sieve and the preparation method therefor and the application thereof. The SCM-33 molecular sieve is a novel molecular sieve with RTE topology and the molecular sieve requires short preparation time, involves a low synthesis cost and has a smaller crystal size and elements other than Si can be introduced as catalytic active centers to the framework thereof.

According to the first aspect of the present invention, a SCM-33 molecular sieve is provided. The SCM-33 molecular sieve has a schematic chemical composition as shown in the formula "$SiO_2 \cdot 1/x\ XO_{1.5} \cdot m\ MO_{0.5}$", wherein X is a framework trivalent element, the Si/X molar ratio x is ≥5, M is a framework equilibrium cation, and the M/Si molar ratio is 0<m≤1; the SCM-33 molecular sieve has an X-ray diffraction pattern shown in the following table:

| 2θ (°) | d-spacing (Å) | relative intensity, $(I/I_0) \times 100$ |
|---|---|---|
| 9.20 ± 0.3 | 9.61 ± 0.40 | s-vs |
| 14.17 ± 0.3 | 6.24 ± 0.30 | s-vs |
| 17.88 ± 0.3 | 4.96 ± 0.20 | m-s |
| 19.63 ± 0.3 | 4.52 ± 0.15 | m-s |
| 20.65 ± 0.1 | 4.30 ± 0.10 | vs |
| 21.72 ± 0.3 | 4.09 ± 0.10 | m-s. |

Furthermore, the X-ray diffraction pattern of the SCM-33 molecular sieve has X-ray diffraction peaks shown in the following table:

| 2θ (°) | d-spacing (Å) | relative intensity, $(I/I_0) \times 100$ |
|---|---|---|
| 9.20 ± 0.3 | 9.61 ± 0.40 | s-vs |
| 12.22 ± 0.3 | 7.24 ± 0.30 | w-m |
| 13.00 ± 0.05 | 6.80 ± 0.05 | m-s |
| 14.17 ± 0.3 | 6.24 ± 0.30 | s-vs |
| 17.88 ± 0.3 | 4.96 ± 0.20 | m-s |
| 19.63 ± 0.3 | 4.52 ± 0.15 | m-s |
| 20.65 ± 0.1 | 4.30 ± 0.10 | vs |
| 21.72 ± 0.3 | 4.09 ± 0.10 | m-s. |

Furthermore, the X-ray diffraction pattern of the SCM-33 molecular sieve also includes X-ray diffraction peaks shown in the following table:

| 2θ (°) | d-spacing (Å) | relative intensity, $(I/I_0) \times 100$ |
|---|---|---|
| 15.77 ± 0.3 | 5.61 ± 0.25 | vw |
| 16.32 ± 0.3 | 5.43 ± 0.25 | vw |
| 18.39 ± 0.3 | 4.82 ± 0.20 | w |
| 23.60 ± 0.3 | 3.77 ± 0.10 | vw-w |
| 24.57 ± 0.3 | 3.62 ± 0.05 | w-m |
| 26.04 ± 0.3 | 3.42 ± 0.05 | m-s |
| 27.54 ± 0.3 | 3.24 ± 0.05 | m-s. |

Furthermore, the X-ray diffraction pattern of the SCM-33 molecular sieve further includes X-ray diffraction peaks shown in the following table:

| 2θ (°) | d-spacing (Å) | relative intensity, $(I/I_0) \times 100$ |
|---|---|---|
| 12.89 ± 0.05 | 6.86 ± 0.05 | w-m |
| 20.44 ± 0.1 | 4.34 ± 0.10 | s-vs |
| 25.24 ± 0.3 | 3.53 ± 0.05 | w-m |
| 28.49 ± 0.3 | 3.13 ± 0.05 | w-m |
| 29.22 ± 0.3 | 3.05 ± 0.05 | m-s. |

Furthermore, in the schematic chemical composition formula of the SCM-33 molecular sieve, the molar ratio of Si/X is preferably 10≤x≤200, more preferably 15≤x≤150, even more preferably 20≤x≤120, and/or the molar ratio of M/Si is preferably 0.01≤m≤0.85, more preferably 0.015≤m≤0.8, even more preferably 0.02≤m≤0.75.

The process for synthesizing the SCM-33 molecular sieve involves the form of the as-made state thereof which has a schematic chemical composition as shown in the formula "$qQ \cdot SiO_2 \cdot 1/x\ XO_{1.5} \cdot m\ MO_{0.5} \cdot z\ H_2O$", wherein the Si/X molar ratio x is ≥5, preferably 10≤x≤200, more preferably 15≤x≤150, and even more preferably 20≤x≤120; the molar ratio of M/Si is 0≤m≤1, preferably 0.01≤m≤0.85, more preferably 0.015≤m≤0.8, even more preferably 0.02≤m≤0.75; the molar ratio of $H_2O/Si$ is as follows:

0.005≤z≤2, preferably 0.01≤z≤1.5, more preferably 0.015≤z≤1, even more preferably 0.02≤z≤0.5; Q is an organic template, and the molar ratio of Q/Si is as follows: 0.01≤q≤1.0, preferably 0.02≤q≤0.5, more preferably 0.05≤q≤0.5, even more preferably 0.05≤q≤0.3.

The organic template Q is preferably selected from a substance containing isopropyl trimethylammonium cation whose structural formula is as follows:

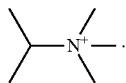

Furthermore, the organic template Q is more preferably a hydroxide containing isopropyl trimethylammonium cation, such as isopropyl trimethylammonium hydroxide.

Furthermore, the framework trivalent element X is selected from at least one of aluminum, boron, iron, gallium, indium and chromium. Furthermore, the framework equilibrium cation M is selected from at least one of proton, ammonium cation, sodium cation, potassium cation, lithium cation, rubidium cation, cesium cation, magnesium cation, calcium cation, strontium cation and barium cation, preferably M at least includes potassium cation or M at least includes potassium cation and sodium cation. M, when including potassium cation and sodium cation, preferably includes more potassium cations than sodium cations.

Furthermore, no more than 10 wt % of Si atoms in the SCM-33 molecular sieve are replaced by at least one non-silicon tetravalent framework element Y which is preferably selected from at least one of germanium, tin, titanium, zirconium and hafnium.

Furthermore, the crystalline average particle size of the SCM-33 molecular sieve is about 100~200 nm.

According to the second aspect of the invention, a method for preparing the aforementioned SCM-33 molecular sieve is provided, which comprises the step of mixing a silicon source, a framework trivalent element X source, a framework equilibrium cation M source, an organic template Q and water for a crystallization reaction to obtain the SCM-33 molecular sieve.

Furthermore, the method for preparing the SCM-33 molecular sieve can also include the step of mixing a non-silicon tetravalent framework element Y source, a silicon source, a framework trivalent element X source, a framework equilibrium cation M source, an organic template Q and water for a crystallization reaction to obtain the SCM-33 molecular sieve.

Furthermore, the organic template Q is selected from a substance containing isopropyl trimethylammonium cation whose structural formula is as follows:

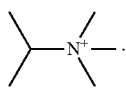

Furthermore, the organic template Q is preferably a hydroxide containing isopropyl trimethylammonium cation, such as isopropyl trimethylammonium hydroxide.

Furthermore, the silicon source is selected from at least one of water glass, silica-sol, solid silica gel, fumed silica, amorphous silica, diatomite, zeolite molecular sieve and tetraalkoxysilane.

Furthermore, the framework trivalent element X source is selected from at least one of aluminum source, boron source, iron source, gallium source, indium source and chromium source; the aluminum source is preferably selected from at least one of aluminum sulfate, sodium aluminate, aluminum nitrate, aluminum chloride, pseudo boehmite, aluminum oxide, aluminum hydroxide, aluminosilicate zeolite, aluminum carbonate, aluminum, aluminum isopropoxide and aluminum acetate; the boron source is preferably selected from at least one of boric acid, sodium tetraborate, amorphous boron oxide, potassium borate, sodium metaborate, ammonium tetraborate and organic boron ester; the iron source is preferably selected from at least one of ferric sulfate, ferric nitrate, ferric halide (such as iron trichloride), ferrocene and ferric citrate; the gallium source, indium source and chromium source can be selected from at least one of the conventional substances in the art, such as gallium oxide, gallium nitrate, indium oxide, indium nitrate, chromium chloride and chromium nitrate, etc.

Furthermore, the framework equilibrium cation M source is selected from at least one of proton source, ammonium cation source, sodium cation source, potassium cation source, lithium cation source, rubidium cation source, cesium cation source, magnesium cation source, calcium cation source, strontium cation source and barium cation source, preferably, the M source at least includes a potassium cation source or the M source at least includes a potassium cation source and a sodium cation source. When using the potassium cation source and the sodium cation source, it is preferable to use more potassium cations than sodium cations, for example, the molar ratio of potassium/sodium is 1.1 or more. The potassium cation source is preferably selected from at least one of potassium oxide, potassium hydroxide, potassium carbonate, potassium bicarbonate, potassium chloride, potassium nitrate, potassium sulfate and potassium fluoride; the sodium cation source is preferably selected from at least one of sodium oxide, sodium hydroxide, sodium carbonate, sodium bicarbonate, sodium chloride, sodium nitrate, sodium sulfate and sodium fluoride.

Furthermore, the non-silicon tetravalent framework element Y source is preferably selected from at least one of germanium source, tin source, titanium source, zirconium source and hafnium source, more preferably selected from at least one of germanium oxide source, tin oxide source, titanium oxide source, zirconium oxide source and hafnium oxide source.

Furthermore, the molar ratio of the organic template Q, the silicon source (based on $SiO_2$), the X source (based on $X_2O_3$), the M source (based on $M_2O$ or MO) and water is Q:$SiO_2$:$X_2O_3$:$M_2O$ (or MO):$H_2O$=0.05~1:1:0~0.1:0~0.5:10~100, wherein the amounts of X source and M source are not 0, preferably Q:$SiO_2$:$X_2O_3$:$M_2O$ (or MO):$H_2O$=0.15~0.55:1:0.004~20.033:0.01~0.375:14~55.

Furthermore, the molar ratio of the non-silicon tetravalent framework element Y source (based on the corresponding oxide $YO_2$) to the silicon source (based on $SiO_2$) $YO_2$/$SiO_2$=greater than 0~0.1, preferably 0.0~10.1, more preferably 0.01~0.08.

Furthermore, the conditions of the crystallization reaction include: crystallization at 100-200° C. for 30-400 hours, preferably crystallization at 110~190° C. for 48~300 hours, more preferably crystallization at 120~180° C. for 72~200 hours.

After the crystallization reaction, conventional post-treatments such as filtering, washing and drying are carried out to prepare an as-made powder of the molecular sieve, and then the as-made powder is calcined to obtain a molecular sieve.

According to the third aspect of the present invention, a molecular sieve composite, including the SCM-33 molecular sieve according to the aforementioned first aspect or the SCM-33 molecular sieve prepared according to the method in the aforementioned second aspect, and a binder, is provided.

According to the fourth aspect of the present invention, the use of the SCM-33 molecular sieve according to the aforementioned first aspect, the SCM-33 molecular sieve prepared according to the method in the aforementioned second aspect or the SCM-33 molecular sieve composite according to the aforementioned third aspect as adsorbent or catalyst is provided.

The SCM-33 molecular sieve of the present invention, whose framework topology is RTE, is a novel non-pure silicon molecular sieve different from RUB-3, and enriches the types of RTE molecular sieve.

The SCM-33 molecular sieve of the present invention has a regular molecular size, a pore structure, a strong acidity, an ion exchange performance and a high thermal and hydrothermal stability. The crystalline size of the obtained SCM-33 zeolite molecular sieve is about 100~200 nm, which circumvents the limited mass transfer and diffusion within the pores due to the bulky crystal.

The method for preparing the SCM-33 molecular sieve provided by the present invention utilizes a lower-priced organic template, saves the synthesis cost compared with the prior art; the molecular sieve requires a short crystallization time, which greatly shortens the synthesis period; the method allows the introduction of various elements such as Al, Ti, Zr and Fe into the framework to generate different catalytic active centers, which meets the needs of different catalytic reactions and has a wider application. The method of the present invention is simple to operate, highly efficient, and beneficial to the industrial popularization.

SPECIFIC EMBODIMENTS

In order to facilitate the understanding of the present invention, the following examples are listed in the present invention. However, those skilled in the art should understand that the examples only serve to assist the understanding of the present invention, and should not be regarded as a specific limitation to the present invention.

In the context of the present specification, among the XRD data of the molecular sieve, vw, w, m, s, vs indicate the intensity of diffraction peaks, with vw referring to very weak, w referring to weak, m to medium, s to strong, vs to very strong, which has been well known to those skilled in the art. In general, vw is less than 5; w is 5-20; m is 20-40; s is 40-70; vs is greater than 70.

In the context of the present specification, the structure of the molecular sieve is confirmed by the X-ray diffraction (XRD) pattern, while the X-ray diffraction (XRD) pattern of the molecular sieve is determined by X-ray powder diffractometer equipped with a Cu-Kα ray source and a Ni filter, where the Kα1 wavelength $\lambda=1.5405980$ Å.

In the present invention, an X' Pert PRO X-ray powder diffractometer (XRD) manufactured from PANalytical B.V. is used, with a working voltage of 40 kV, a current of 40 mA and a scanning range of 5-40°. The product morphology is measured with S-4800 Field Emission Scanning Electron Microscope (Fe-SEM) manufactured from HITACHI.

It should be noted particularly that the two or more aspects (or embodiments) disclosed in the context of the present specification can be arbitrarily combined with each other, and the technical solutions (such as methods or systems) thus formed are a part of the original disclosure in the present specification, and also fall within the scope of protection in the present specification.

Unless otherwise specified, all percentages, parts, ratios, etc. mentioned in the present specification are based on weight, unless taking weight as a basis is not in accordance with the conventional understanding of those skilled in the art.

Example 1

Figure 1:
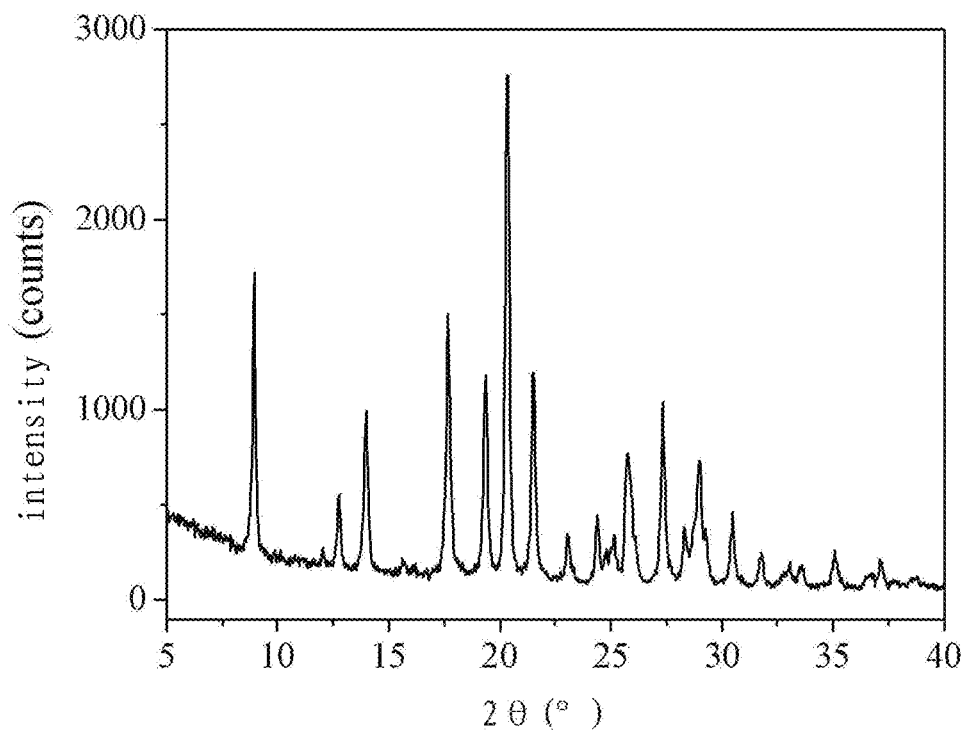
FIG. 1 is the X-ray diffraction (XRD) pattern of the sample obtained in Example 1 before calcination.
Figure 2:
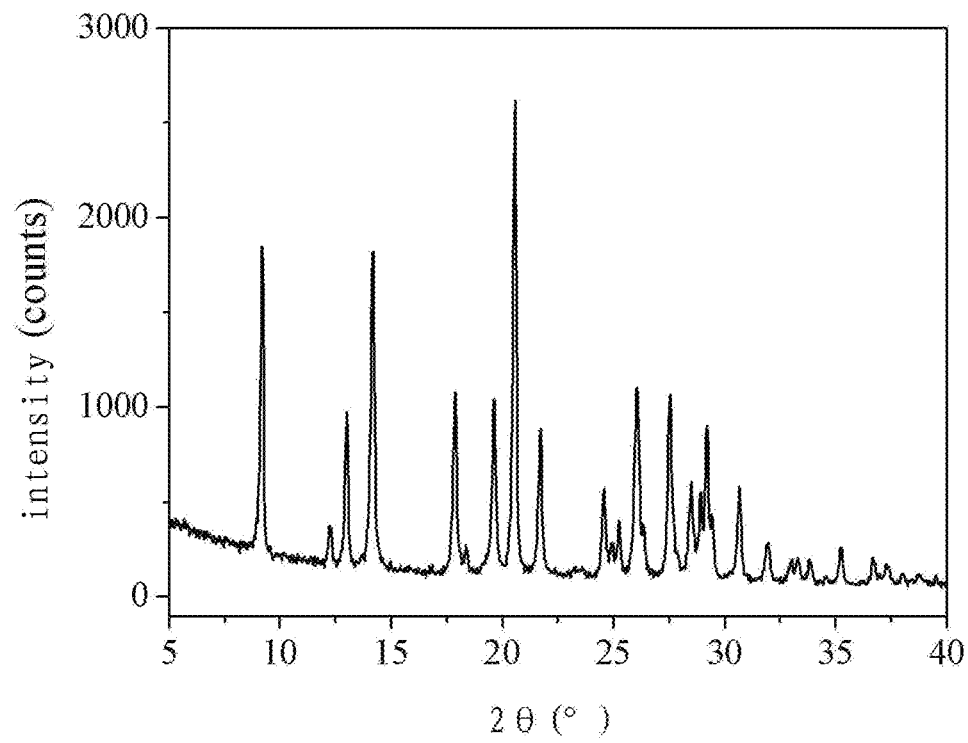
FIG. 2 is the X-ray diffraction (XRD) pattern of the sample obtained in Example 1 after calcination.
Figure 3:
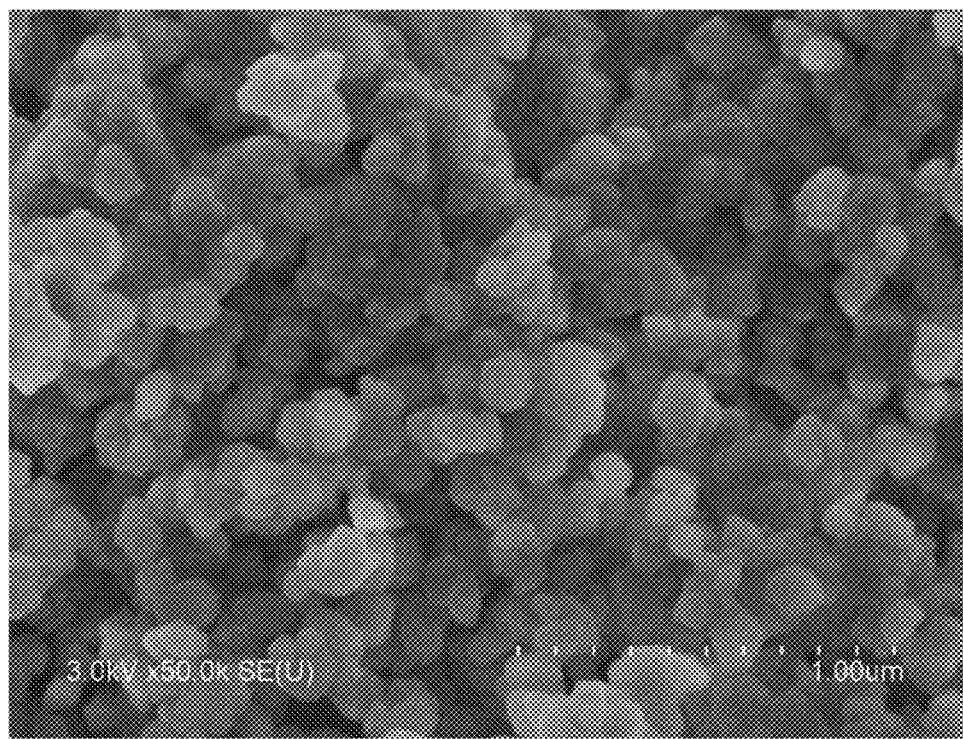
FIG. 3 is a scanning electron microscope (SEM) photograph of the sample obtained in Example 1.

2.5 g of sodium metaaluminate ($Al_2O_3$ 41 wt %, $Na_2O$ 58 wt %) and 17.5 g of potassium hydroxide solution (30 wt %) were dissolved in 28 g of water, 39.4 g of isopropyl trimethylammonium hydroxide solution (20 wt %) was added and stirred evenly, finally 60 g of Ludox AS-40 silica sol was added slowly under stirring; after stirring for 1 hour, the above mixture was charged into a crystallization kettle with a polytetrafluoroethylene lining, and placed in an oven at 155° C. for crystallization for 144 hours. After the reaction, the solid was filtered, washed with distilled water and dried at 100° C. to obtain an as-made powder of SCM-33 molecular sieve. The XRD pattern is shown in FIG. 1. The as-made powder solid was placed in a muffle furnace and calcined at 550° C. for 5 hours to obtain the final product. The XRD pattern is shown in FIG. 2. The SEM photograph of the SCM-33 molecular sieve is shown in FIG. 3.

Therein, the XRD pattern data of the final product obtained in Example 1 are shown in Table 1:

TABLE 1

| 2θ (°) | d-spacing (Å) | relative intensity, $(I/I_0) \times 100$ |
|---|---|---|
| 9.20 | 9.61 | 65.4 |
| 12.22 | 7.24 | 7.7 |
| 12.91 | 6.85 | 15.9 |
| 13.00 | 6.80 | 32.4 |
| 14.17 | 6.24 | 67.2 |
| 15.82 | 5.60 | 1.2 |
| 16.35 | 5.42 | 0.1 |
| 17.88 | 4.96 | 38.4 |
| 18.39 | 4.82 | 5.2 |
| 19.63 | 4.52 | 35.8 |
| 20.53 | 4.32 | 65 |
| 20.60 | 4.31 | 100 |
| 21.72 | 4.09 | 30.4 |
| 23.24 | 3.82 | 1.5 |
| 23.60 | 3.77 | 1.6 |
| 24.57 | 3.62 | 17.9 |
| 24.94 | 3.57 | 6.3 |
| 25.24 | 3.53 | 10.7 |
| 26.04 | 3.42 | 39.5 |
| 27.54 | 3.24 | 37.6 |

TABLE 1-continued

| 2θ (°) | d-spacing (Å) | relative intensity, (I/I₀) × 100 |
|---|---|---|
| 28.49 | 3.13 | 14.8 |
| 28.92 | 3.08 | 17 |
| 29.22 | 3.05 | 31.2 |
| 30.66 | 2.91 | 19.5. |

Example 2

2.5 g of sodium metaaluminate ($Al_2O_3$ 41 wt %, $Na_2O$ 58 wt %) and 13.7 g of potassium hydroxide solution (30 wt %) were dissolved in 64 g of water, 39.4 g of isopropyl trimethylammonium hydroxide solution (20 wt %) was added and stirred evenly, finally 60 g of Ludox AS-40 silica sol was added slowly under stirring; after stirring for 1 hour, the above mixture was charged into a crystallization kettle with a polytetrafluoroethylene lining, and placed in an oven at 160° C. for crystallization for 120 hours. After the reaction, the solid was filtered, washed, dried and calcined (the post-treatment conditions are the same as those in Example 1) to obtain a SCM-33 zeolite molecular sieve. The XRD pattern is similar to FIG. 2. Therein, the XRD pattern data of the final product obtained in Example 2 are shown in Table 2:

TABLE 2

| 2θ (°) | d-spacing (Å) | relative intensity, (I/I₀) × 100 |
|---|---|---|
| 9.20 | 9.60 | 76.1 |
| 12.26 | 7.21 | 8.7 |
| 12.94 | 6.84 | 23.5 |
| 13.00 | 6.80 | 38 |
| 14.18 | 6.24 | 74 |
| 15.75 | 5.62 | 0.3 |
| 16.35 | 5.42 | 0.1 |
| 17.91 | 4.95 | 37.1 |
| 18.40 | 4.82 | 5.3 |
| 19.63 | 4.52 | 37.6 |
| 20.49 | 4.33 | 61.2 |
| 20.56 | 4.32 | 100 |
| 21.70 | 4.09 | 28.3 |
| 23.27 | 3.82 | 2.5 |
| 23.60 | 3.77 | 1.8 |
| 24.57 | 3.62 | 17.4 |
| 24.88 | 3.58 | 6.5 |
| 25.27 | 3.52 | 9.7 |
| 26.04 | 3.42 | 41.1 |
| 27.55 | 3.24 | 36 |
| 28.51 | 3.13 | 13.4 |
| 28.95 | 3.08 | 15.6 |
| 29.22 | 3.05 | 28.3 |
| 30.69 | 2.91 | 18.6. |

Example 3

7.5 g of sodium hydroxide solution (30 wt %), 15 g of potassium hydroxide solution (30 wt %), 40 g of $H_2O$ and 47.3 g of isopropyl trimethylammonium hydroxide solution (20 wt %) were stirred evenly, 45 g of Ludox AS-40 silica sol was added slowly under stirring; after stirring for 1 hour, 6.6 g of USY molecular sieve ($SiO_2/Al_2O_3$=12) was added; after stirring for 1.5 hours, the above mixture was charged into a crystallization kettle with a polytetrafluoroethylene lining, and placed in an oven at 165° C. for crystallization for 96 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2. Therein, the XRD pattern data of the final product obtained in Example 3 are shown in Table 3:

TABLE 3

| 2θ (°) | d-spacing (Å) | relative intensity, (I/I₀) × 100 |
|---|---|---|
| 9.27 | 9.53 | 94 |
| 12.34 | 7.17 | 9 |
| 12.91 | 6.85 | 20.1 |
| 13.07 | 6.77 | 38.5 |
| 14.25 | 6.21 | 59.3 |
| 15.78 | 5.61 | 0.6 |
| 16.32 | 5.43 | 0.6 |
| 17.93 | 4.94 | 27.7 |
| 18.48 | 4.80 | 7 |
| 19.69 | 4.50 | 25.7 |
| 20.54 | 4.32 | 57.6 |
| 20.66 | 4.30 | 100 |
| 21.83 | 4.07 | 22.4 |
| 23.07 | 3.85 | 0.2 |
| 23.54 | 3.78 | 2.1 |
| 24.67 | 3.61 | 15.1 |
| 25.34 | 3.51 | 7.3 |
| 26.15 | 3.41 | 38.5 |
| 27.65 | 3.22 | 29 |
| 28.61 | 3.12 | 13.9 |
| 29.31 | 3.04 | 30.8 |
| 30.79 | 2.90 | 12.8. |

Example 4

4.2 g of aluminum sulfate octadecahydrate, 6.2 g of sodium hydroxide solution (30 wt %) and 13.7 g of potassium hydroxide solution (30 wt %) were dissolved in 21.1 g of water, 110 g of isopropyl trimethylammonium hydroxide solution (20 wt %) was added and stirred evenly, finally, 54 g of Ludox AS-40 silica gel was added slowly under stirring; after stirring for 1 hour, the above mixture was charged into a crystallization kettle with a polytetrafluoroethylene lining, and placed in an oven at 150° C. for crystallization for 180 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2.

Example 5

2 g of aluminum isopropoxide was added into 40 g of isopropyl trimethylammonium hydroxide solution (20 wt %) and 12 g of potassium hydroxide solution (30 wt %); after dissolution, 75 g of water was added, 52 g of tetraethyl orthosilicate was added slowly; after a complete hydrolysis, the above mixture was charged into a crystallization kettle with a polytetrafluoroethylene lining, and placed in an oven at 175° C. for crystallization for 144 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2.

Example 6

9.7 g of rubidium chloride and 26 g of potassium hydroxide solution (30 wt %) were dissolved in 68.5 g of water, 39.4 g of isopropyl trimethylammonium hydroxide solution (20 wt %) was added and stirred evenly, 54.6 g of Ludox AS-40 silica sol was slowly added under stirring; after stirring for 1 hour, 5 g of USY molecular sieve ($SiO_2/Al_2O_3$=12) was added; after stirring for 1.5 hours, the above mixture was charged into a crystallization kettle with a polytetrafluoroethylene lining, and placed in an oven at 145° C. for crystallization for 192 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2.

Example 7

0.6 g of pseudo boehmite ($Al_2O_3$ 70 wt %) and 17 g of potassium hydroxide solution (30 wt %) were dissolved in 30 g of water, 49.3 g of isopropyl trimethylammonium hydroxide solution (20 wt %) was added and stirred evenly, 15 g of water glass ($SiO_2$ 27 wt %, $Na_2O$ 8.4 wt %) and 45 g of Ludox AS-40 silica sol were added slowly under stirring; after stirring for 1 hour, the above mixture was charged into a crystallization kettle with a polytetrafluoroethylene lining, and placed in an oven at 160° C. for crystallization for 168 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2.

Example 8

1.3 g of boric acid, 9 g of sodium hydroxide solution (30 wt %) and 14 g of potassium hydroxide solution (30 wt %) were dissolved in 41 g of water, 49.3 g of isopropyl trimethylammonium hydroxide solution (20 wt %) was added and stirred evenly, 75 g of Ludox AS-40 silica sol was added slowly under stirring; after stirring for 1 hour, the above mixture was charged into a crystallization kettle with a polytetrafluoroethylene lining, and placed in an oven at 160° C. for crystallization for 192 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2. Therein, the XRD pattern data of the final product obtained in Example 8 are shown in Table 4:

TABLE 4

| 2θ (°) | d-spacing (Å) | relative intensity, ($I/I_0$) × 100 |
|---|---|---|
| 9.26 | 9.55 | 100 |
| 12.28 | 7.20 | 11.2 |
| 12.91 | 6.85 | 16 |
| 13.04 | 6.78 | 40.3 |
| 14.21 | 6.23 | 68.2 |
| 15.78 | 5.61 | 0.1 |
| 16.36 | 5.41 | 1.5 |
| 17.92 | 4.94 | 32.5 |
| 18.47 | 4.80 | 5.5 |
| 19.72 | 4.50 | 34.5 |
| 20.53 | 4.32 | 51.8 |
| 20.63 | 4.30 | 98.8 |
| 21.77 | 4.08 | 28.9 |
| 23.27 | 3.82 | 2.1 |
| 23.64 | 3.76 | 1 |
| 24.66 | 3.61 | 14.3 |
| 25.03 | 3.56 | 3.4 |
| 25.33 | 3.51 | 7.7 |
| 26.11 | 3.41 | 39.2 |

TABLE 4-continued

| 2θ (°) | d-spacing (Å) | relative intensity, ($I/I_0$) × 100 |
|---|---|---|
| 27.62 | 3.23 | 28.3 |
| 28.61 | 3.12 | 12.3 |
| 28.99 | 3.08 | 14.7 |
| 29.26 | 3.05 | 28.2 |
| 30.76 | 2.90 | 15.5. |

Example 9

4.8 g of ferric nitrate nonahydrate, 9 g of sodium hydroxide solution (30 wt %) and 14 g of potassium hydroxide solution (30 wt %) were dissolved in 150 g of water, 49.3 g of isopropyl trimethylammonium hydroxide solution (20 wt %) was added and stirred evenly, 75 g of Ludox AS-40 silica sol was added slowly under stirring; after stirring for 1 hour, the above mixture was charged into a crystallization kettle with a polytetrafluoroethylene lining, and placed in an oven at 150° C. for crystallization for 216 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2.

Example 10

4 g of titanium sulfate, 0.4 g of boric acid, 8 g of sodium hydroxide solution (30 wt %), 15 g of potassium hydroxide solution (30 wt %) were dissolved in 50 g of water, 49.3 g of isopropyl trimethylammonium hydroxide solution (20 wt %) was added and stirred evenly, 60 g of Ludox AS-40 silica sol was added slowly under stirring; after stirring for 1 hour, the above mixture was charged into a crystallization kettle with a polytetrafluoroethylene lining, and placed in an oven at 170° C. for crystallization for 120 hours. After the reaction, the solid was filtered, washed, dried and calcined (the post-treatment reaction conditions are the same as in Example 1) to obtain a SCM-33 zeolite molecular sieve, and the XRD pattern is similar to FIG. 2. Therein, the XRD pattern data of the final product obtained in Example 10 are shown in Table 5.

TABLE 5

| 2θ (°) | d-spacing (Å) | relative intensity, ($I/I_0$) × 100 |
|---|---|---|
| 9.23 | 9.57 | 96.9 |
| 12.30 | 7.19 | 11.9 |
| 12.92 | 6.85 | 19.8 |
| 13.04 | 6.78 | 40 |
| 14.21 | 6.23 | 84.5 |
| 15.75 | 5.62 | 0.8 |
| 16.36 | 5.41 | 1.5 |
| 17.92 | 4.95 | 39 |
| 18.48 | 4.80 | 5.1 |
| 19.69 | 4.50 | 37.3 |
| 20.52 | 4.33 | 51.4 |
| 20.63 | 4.30 | 100 |
| 21.77 | 4.08 | 37.7 |
| 23.23 | 3.83 | 1.9 |
| 23.67 | 3.76 | 1.2 |
| 24.63 | 3.61 | 16.5 |
| 25.31 | 3.52 | 8 |
| 26.14 | 3.41 | 37.3 |
| 27.61 | 3.23 | 30.2 |
| 28.58 | 3.12 | 13 |
| 29.32 | 3.04 | 28.4 |
| 30.73 | 2.91 | 16.6. |

Comparative Example 1

2.5 g of sodium metaaluminate ($Al_2O_3$ 41 wt %, $Na_2O$ 58 wt %) and 17.5 g of potassium hydroxide solution (30 wt %) were dissolved in 28 g of water, 30 g of tetramethyl ammonium hydroxide solution (20 wt %) was added and stirred evenly, finally 60 g of Ludox AS-40 silica sol was slowly added under stirring; after stirring for 1 hour, the above mixture was charged into a crystallization kettle with a polytetrafluoroethylene lining, and placed in an oven at 155° C. for crystallization for 144 hours. After the reaction, the solid was filtered, washed, dried and calcined (the post-treatment reaction conditions are the same as in Example 1) to obtain a molecular sieve, which, after XRD analysis, is a RUT molecular sieve. Its XRD pattern is obviously different from FIG. 2. The XRD pattern data are shown in Table 6:

TABLE 6

| 2θ (°) | d-spacing (Å) | relative intensity, ($I/I_0$) × 100 |
|---|---|---|
| 7.80 | 11.32 | 5 |
| 10.09 | 8.76 | 16.3 |
| 10.82 | 8.17 | 89.1 |
| 13.68 | 6.47 | 28.3 |
| 14.43 | 6.13 | 85.8 |
| 15.82 | 5.60 | 4.6 |
| 15.82 | 5.60 | 4.6 |
| 16.65 | 5.32 | 7.7 |
| 19.32 | 4.59 | 8.7 |
| 20.07 | 4.42 | 53.1 |
| 20.64 | 4.30 | 53.7 |
| 21.57 | 4.12 | 3.2 |
| 21.78 | 4.08 | 28.6 |
| 22.09 | 4.02 | 94 |
| 22.49 | 3.95 | 100 |
| 23.09 | 3.85 | 97 |
| 23.23 | 3.83 | 44.9 |
| 23.51 | 3.78 | 6.1 |
| 24.08 | 3.69 | 16.7 |
| 25.19 | 3.53 | 38.3 |
| 25.99 | 3.43 | 4 |
| 26.99 | 3.30 | 4.5 |
| 27.38 | 3.26 | 37.7 |

Comparative Example 2

2.5 g of sodium metaaluminate ($Al_2O_3$ 41 wt %, $Na_2O$ 58 wt %) and 17.5 g of potassium hydroxide solution (30 wt %) were dissolved in 28 g of water, 48.7 g of tetraethyl ammonium hydroxide solution (20 wt %) was added and stirred evenly, finally 60 g of Ludox AS-40 silica sol was slowly added under stirring; after stirring for 1 hour, the above mixture was charged into a crystallization kettle with a polytetrafluoroethylene lining, and placed in an oven at 155° C. for crystallization for 144 hours. After the reaction, the solid was filtered, washed, dried and calcined (the post-treatment reaction conditions are the same as in Example 1) to obtain a molecular sieve, which, after XRD analysis, is a BEA molecular sieve. Its XRD pattern is obviously different from FIG. 2. The XRD pattern data are shown in Table 7:

TABLE 7

| 2θ (°) | d-spacing (Å) | relative intensity, ($I/I_0$) × 100 |
|---|---|---|
| 7.23 | 12.22 | 16.7 |
| 7.59 | 11.65 | 18.4 |
| 9.66 | 9.15 | 3.5 |

TABLE 7-continued

| 2θ (°) | d-spacing (Å) | relative intensity, ($I/I_0$) × 100 |
|---|---|---|
| 11.61 | 7.62 | 1.5 |
| 13.29 | 6.66 | 1.2 |
| 16.51 | 5.36 | 4.3 |
| 21.43 | 4.14 | 11.2 |
| 22.46 | 3.95 | 100 |
| 25.30 | 3.52 | 6.7 |
| 26.78 | 3.33 | 15.5 |
| 28.82 | 3.10 | 3.7 |
| 29.48 | 3.03 | 15.9 |
| 30.46 | 2.93 | 3.7 |

The invention claimed is:

1. A SCM-33 molecular sieve, wherein the SCM-33 molecular sieve has a chemical composition of formula $SiO_2 \cdot 1/x\ XO_{1.5} \cdot m\ MO_{0.5}$, wherein X is a framework trivalent element, the Si/X molar ratio x is ≥5, M is a framework equilibrium cation, and the M/Si molar ratio is 0<m≤1; and the SCM-33 molecular sieve has an X-ray diffraction pattern shown in the following table:

| 2θ (°) | d-spacing (Å) | relative intensity, ($I/I_0$) × 100 |
|---|---|---|
| 9.20 ± 0.3 | 9.61 ± 0.40 | s-vs |
| 14.17 ± 0.3 | 6.24 ± 0.30 | s-vs |
| 17.88 ± 0.3 | 4.96 ± 0.20 | m-s |
| 19.63 ± 0.3 | 4.52 ± 0.15 | m-s |
| 20.65 ± 0.1 | 4.30 ± 0.10 | vs |
| 21.72 ± 0.3 | 4.09 ± 0.10 | m-s. |

2. The molecular sieve according to claim 1, wherein the X-ray diffraction pattern of the SCM-33 molecular sieve has X-ray diffraction peaks shown in the following table:

| 2θ (°) | d-spacing (Å) | relative intensity, ($I/I_0$) × 100 |
|---|---|---|
| 9.20 ± 0.3 | 9.61 ± 0.40 | s-vs |
| 12.22 ± 0.3 | 7.24 ± 0.30 | w-m |
| 13.00 ± 0.05 | 6.80 ± 0.05 | m-s |
| 14.17 ± 0.3 | 6.24 ± 0.30 | s-vs |
| 17.88 ± 0.3 | 4.96 ± 0.20 | m-s |
| 19.63 ± 0.3 | 4.52 ± 0.15 | m-s |
| 20.65 ± 0.1 | 4.30 ± 0.10 | vs |
| 21.72 ± 0.3 | 4.09 ± 0.10 | m-s. |

3. The molecular sieve according to claim 2, wherein the X-ray diffraction pattern of the SCM-33 molecular sieve further includes X-ray diffraction peaks shown in the following table:

| 2θ (°) | d-spacing (Å) | relative intensity, ($I/I_0$) × 100 |
|---|---|---|
| 15.77 ± 0.3 | 5.61 ± 0.25 | vw |
| 16.32 ± 0.3 | 5.43 ± 0.25 | vw |
| 18.39 ± 0.3 | 4.82 ± 0.20 | w |
| 23.60 ± 0.3 | 3.77 ± 0.10 | vw-w |
| 24.57 ± 0.3 | 3.62 ± 0.05 | w-m |
| 26.04 ± 0.3 | 3.42 ± 0.05 | m-s |
| 27.54 ± 0.3 | 3.24 ± 0.05 | m-s. |

4. The molecular sieve according to claim 3, wherein the X-ray diffraction pattern of the SCM-33 molecular sieve further includes X-ray diffraction peaks shown in the following table:

| 2θ (°) | d-spacing (Å) | relative intensity, (I/I₀) × 100 |
|---|---|---|
| 12.90 ± 0.05 | 6.86 ± 0.05 | w-m |
| 20.44 ± 0.1 | 4.34 ± 0.10 | s-vs |
| 25.24 ± 0.3 | 3.53 ± 0.05 | w-m |
| 28.49 ± 0.3 | 3.13 ± 0.05 | w-m |
| 29.22 ± 0.3 | 3.05 ± 0.05 | m-s. |

5. The molecular sieve according to claim 1, wherein, in the formula, the molar ratio of Si/X is 10≤x≤200, and/or the molar ratio of M/Si is 0.01≤m≤0.85.

6. The molecular sieve according to claim 1, wherein a form of an as-made state of the SCM-33 molecular sieve has a chemical composition of formula qQ·SiO$_2$·1/x XO$_{1.5}$·MO$_{0.5}$·z H$_2$O, wherein the Si/X molar ratio x is ≥5, the M/Si molar ratio is 0<m≤1, the H$_2$O/Si molar ratio z is 0.005≤z≤2, Q is an organic template, the Q/Si molar ratio q is 0.01≤q≤1.0.

7. The molecular sieve according to claim 1, wherein the framework trivalent element X is selected from at least one of aluminum, boron, iron, gallium, indium and chromium; the framework equilibrium cation M is selected from at least one of proton, ammonium cation, sodium cation, potassium cation, lithium cation, rubidium cation, cesium cation, magnesium cation, calcium cation, strontium cation and barium cation.

8. The molecular sieve according to claim 6, wherein the Q is an organic template selected from a substance containing isopropyl trimethylammonium cation having a structural formula of

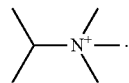

9. The molecular sieve according to claim 1, wherein no more than 10 wt. % of Si atoms in the SCM-33 molecular sieve are replaced by at least one non-silicon tetravalent framework element Y.

10. A method for preparing the molecular sieve according to claim 1, comprising mixing a silicon source, a framework trivalent element X source, a framework equilibrium cation M source, an organic template Q and water to form a reaction mixture; and subjecting the mixture to a crystallization reaction to obtain the molecular sieve.

11. A method for preparing the molecular sieve according to claim 9, comprising mixing a non-silicon tetravalent framework element Y source, a silicon source, a framework trivalent element X source, a framework equilibrium cation M source, an organic template Q and water to form a mixture; and subjecting the mixture to a crystallization reaction to obtain the molecular sieve.

12. The method according to claim 10, wherein the molar ratio of the organic template Q, the silicon source based on SiO$_2$, the X source based on X$_2$O$_3$, the M source based on M$_2$O or MO and water is Q:SiO$_2$:X$_2$O$_3$:M$_2$O or MO:H$_2$O= (0.05-1):1:(0-0.1):(0-0.5):(10-100), wherein the amounts of X source and M source are not 0.

13. The method according to claim 11, wherein the molar ratio of the non-silicon tetravalent framework element Y source based on a corresponding oxide YO$_2$ and the silicon source based on SiO$_2$ is greater than 0-0.1.

14. The method according to claim 10, wherein the crystallization reaction is carried out 100-200° C. for 30-400 hours.

15. The method according to claim 10, wherein: the organic template Q is selected from a substance containing isopropyl trimethylammonium cation having a structural formula of

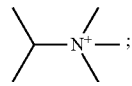

the silicon source is selected from at least one of water glass, silica sol, solid silica gel, fumed silica, amorphous silica, diatomite, zeolite molecular sieve and tetraalkoxysilane;

the framework trivalent element X source is selected from at least one of aluminum source, boron source, iron source, gallium source, indium source and chromium source; the aluminum source is selected from at least one of aluminum sulfate, sodium aluminate, aluminum nitrate, aluminum chloride, pseudo boehmite, aluminum oxide, aluminum hydroxide, aluminosilicate molecular sieve, aluminum carbonate, aluminum, aluminum isopropoxide and aluminum acetate; the boron source is selected from at least one of boric acid, sodium tetraborate, amorphous boron oxide, potassium borate, sodium metaborate, ammonium tetraborate and organic boron ester; the iron source is selected from at least one of ferric sulfate, ferric nitrate, ferric halide, ferrocene and ferric citrate; the gallium source, indium source and chromium source are selected from at least one of gallium oxide, gallium nitrate, indium oxide, indium nitrate, chromium chloride and chromium nitrate;

the framework equilibrium cation M source is selected from at least one of proton source, ammonium cation source, sodium cation source, potassium cation source, lithium cation source, rubidium cation source, cesium cation source, magnesium cation source, calcium cation source, strontium cation source and barium cation source, and/or the non-silicon tetravalent framework element Y source is selected from at least one of germanium source, tin source, titanium source, zirconium source and hafnium source.

16. A molecular sieve composite, comprising the SCM-33 molecular sieve according to claim 1 and a binder.

17. A catalyst comprising the SCM-33 molecular sieve according to claim 1.

18. A molecular sieve composite, comprising the SCM-33 molecular sieve prepared by the method according to claim 10 and a binder.

19. An absorbent comprising the SCM-33 molecular sieve according to claim 1.

20. The molecular sieve according to claim 7, wherein M comprises potassium cation and sodium cation, and an amount of potassium cations is more than an amount of sodium cations.

* * * * *